July 26, 1966  R. ADOUTTE ET AL  3,263,142
DIESEL ELECTRIC TRACTION SYSTEM

Filed Nov. 1, 1965  2 Sheets-Sheet 1

United States Patent Office 3,263,142
Patented July 26, 1966

3,263,142
DIESEL ELECTRIC TRACTION SYSTEM
Roland Adoutte, Karl Schneider, and Max Baumgartner, all of 7 Rte. de Drize, Geneva, Switzerland
Filed Nov. 1, 1965, Ser. No. 505,937
3 Claims. (Cl. 318—99)

This is a continuation-in-part of our application Serial No. 231,089, filed October 17, 1962, and the invention relates to diesel-electric traction systems and more particularly to systems wherein an electric motor is in circuit with a generator driven by a diesel engine.

In a diesel electric traction system comprising a diesel engine, a D.C. generator and one or more electric motors supplied thereby, for instance, in a locomotive, the power of the diesel, for efficient operation, must be fully used at all locomotive speeds. At the same time, the diesel should deliver a particular power when running at a particular speed. This means that the electric power delivered by the generator and taken by the motors should be constant for a given diesel speed. To control the electric machinery in a diesel electric traction system, therefore, the torque-speed characteristic of the electric transmission must be hyperbolic, and this is usually achieved by controlling generator excitation in order to very the generator voltage. Also, means for weakening the field of the motors are provided to increase the speed range possible with a generator of given size.

The electric motors usually used in the known diesel electric traction systems are of the series-wound kind. The generators usually have shunt and anti-compound field windings and a separate field winding for power control purposes. Motor field weakening is usually performed by means of contactors which short-circuit portions of the field windings. With a system of this kind, of course, automatic and continuous control is difficult to provide, the number of field-weakening notches being limited, by practical considerations; also, precautions are necessary to prevent overloads during field-weakening since overloads often cause flashover in the motors. Automatic field-weakening requires equipment whose complexity increases with the number of field-weakening notches. Other suggestions for weakening the field of series-wound motors have been put forward, to the effect that extra exciting windings in opposition to the series windings should be provided, but the means used are relatively complex.

This is one reason why the use of separately excited motors has been suggested. Separately excited motors have the further advantage of having built-in protection against wheel slip, because of their torque-speed characteristics, for the increased speed caused by wheel slip leads to an abrupt reduction of the current and therefore of the torque. Another advantage of separately excited motors is that the direction reverser need not be provided in the power circuit, reversal being effected by way of the field circuits. Another advantage of separately excited motors is that the size of the main generator can be reduced considerably by providing the equivalent of a series-parallel connection of the motors without contactor, for the transfer of the generator voltage to any one of the motors supplied in series by the generator can be effected by gradual and complete weakening of the field of the other motors. However, separately excited motors have some disadvantages, one being that there is a very considerable imbalance between the currents flowing through parallel-fed motors due to manufacturing tolerances, unequal wear of wheels and so on.

It is an object of this invention to simplify the control of separately excited motors and to obviate the disadvantages of their characteristics.

The invention concerns a diesel-electric power system for vehicle traction, comprising a separately excited, diesel-driven D.C. generator adapted to supply current to the armature windings of a plurality of separately excited D.C. traction motors having their armature windings disposed in at least two branches connected in parallel to said generator, an A.C. source connected respectively by means of controlled rectifiers to the field windings of said generator and of the motors in each of said branches, power error signal generating means adapted to continuously deliver a signal proportional to the difference between the predetermined value of the diesel engine power corresponding to the measured speed of said engine and the electric power delivered by the generator, control signal generating means for producing signals controlling the current delivered by each of said rectifiers, said means comprising a first function generator delivering a first control signal for the rectifier supplying the generator field winding, and said first control signal being substantially proportional to said error signal up to a predetermined value thereof and remaining constant at higher values of said error signal, said means further comprising a second function generator delivering a second control signal for the rectifiers supplying the field windings of the motors of said branches, said second control signal being at a constant value thereof until said first control signal attains said predetermined value and thereafter decreasing linearly with increase in said error signal, and said system further comprising means for maintaining the currents passing through said parallel branches at values substantially equal to one another.

By way of example, an embodiment of a diesel-electric traction system according to the invention is illustrated in the accompanying drawings wherein.

Figures 3A, 3B:
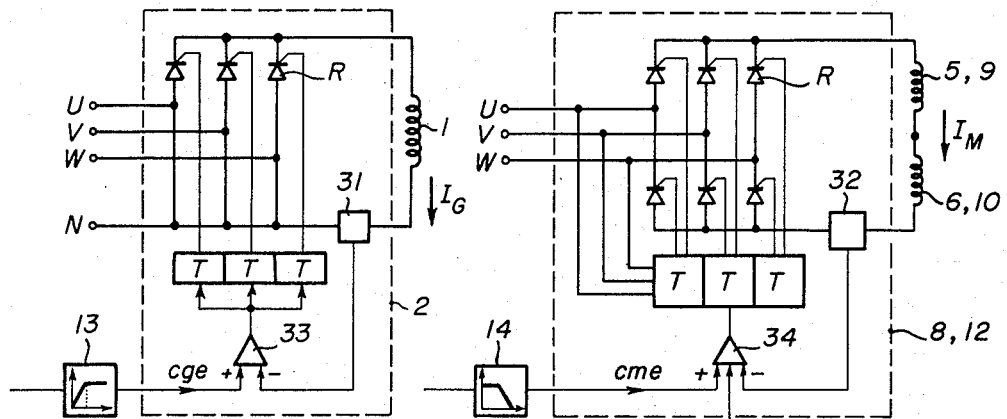

FIGS. 3a and 3b each illustrate diagrammatically an embodiment of a rectifying circuit.

FIGS. 4a to 4e each illustrate diagrammatically an embodiment of a function generator circuit.

Figure 4A:
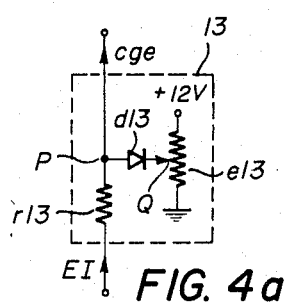
Figure 4B:
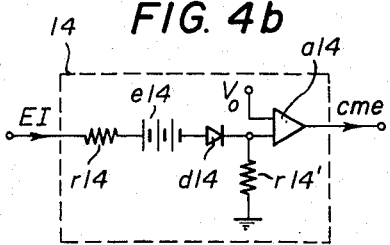
Figure 4C:
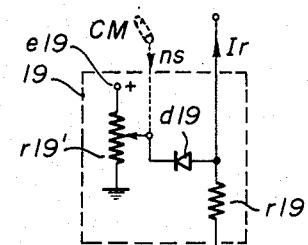
Figure 4D:
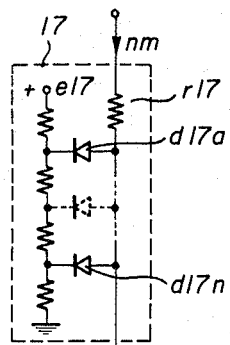
Figures 4E, 5:
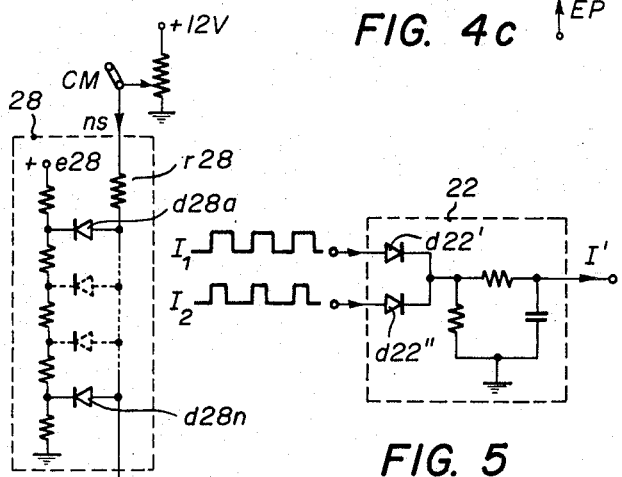

FIG. 5 illustrates an embodiment of a comparator.

Figure 1:
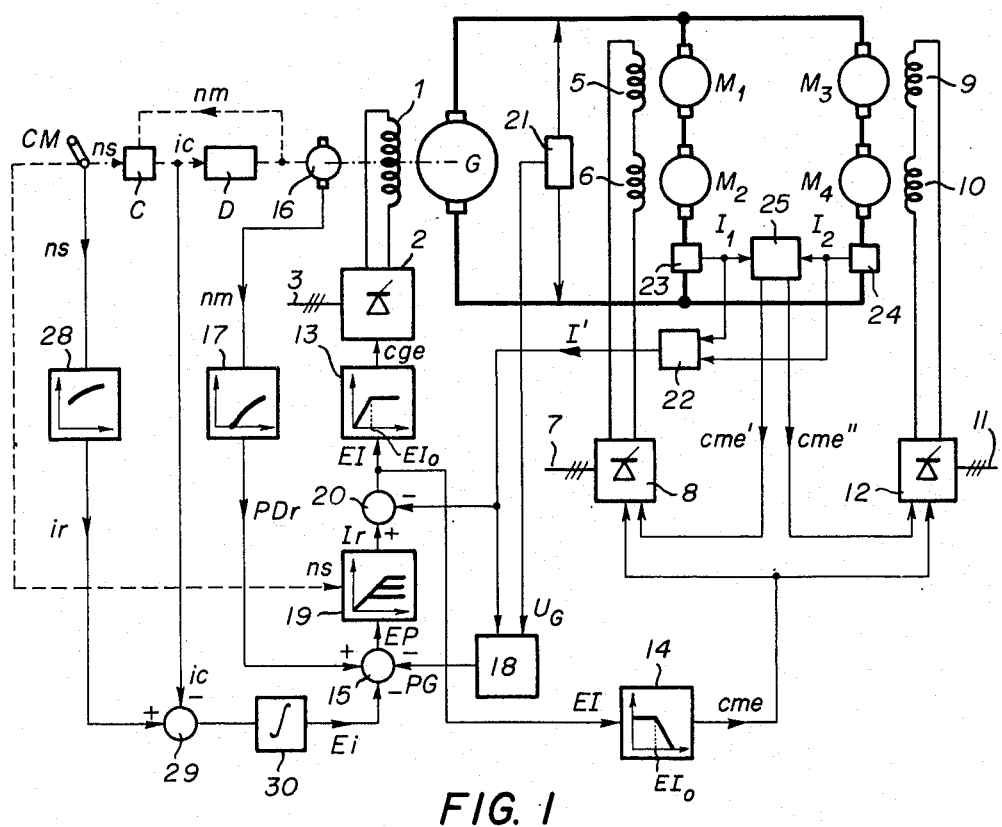
FIG. 1 is the block schematic diagram of the system.

As may be seen in FIG. 1, the diesel-electric traction system comprises a separately excited D.C. generator G driven by a diesel engine D and adapted to supply current to the armature windings of four separately excited traction motors $M_1$, $M_2$ and $M_3$, $M_4$, said windings being arranged in two parallel branches. The diesel engine is provided in the usual manner with an automatic speed control device C, e.g. a centrifugal governor, having a control member CM adapted to set the required engine speed $ns$ and shown in FIG. 1 in form of an actuating lever. As is well known in the diesel engine art, the device C automatically controls the engine speed by varying the amount of injection by delivering to the diesel injector an injection control signal $ic$ which is a function of the difference between the set speed $ns$ and the measured speed $nm$ of the diesel engine. This has been indicated schematically in FIG. 1 by the dotted signal lines $ns$, $nm$ and $ic$, it being understood that these signals may be transmitted to, and delivered by, the control device C either mechanically, hydraulically or in any other suitable manner.

As is further shown schematically in FIG. 1 the excitation current ($I_G$) is supplied to the field winding 1 of the generator G from a three phase A.C. supply 3 by means of a grid-controlled rectifying device 2, while the series-connected field windings 5, 6 and 9, 10 of the motors $M_1$, $M_2$ and $M_3$, $M_4$ are supplied from the three-phase A.C. supplies 7 and 12 by means of grid-controlled rectifying devices 8 and 12 respectively.

A function generator 13 is arranged to deliver a signal $cge$ for controlling the excitation current ($I_G$) transmitted by the rectifying device 2 to the generator field-winding 1. As is indicated in the slope characteristic shown in block 13, in FIG. 1, the output of the function generator 13, i.e. the control signal ($cge$), is directly proportional to the input signal EI delivered by an operational amplified 20 up to a given value ($cge_o$) of said output corresponding to the maximum excitation of the generator G, whereafter it remains constant at this value notwithstanding further increase in amplitude of said input signal EI.

A second function generator 14 is also provided and arranged to receive the signal EI delivered by the summing amplifier 20 and to deliver a signal $cme$ for controlling the motor excitation current ($Im$) transmitted by the rectifying devices 8 and 12 respectively to the motor field windings 5, 6 and 9, 10. As indicated in the characteristic shown in block 14 in FIG. 1, the output of the second function generator 14, i.e. the control signal $cme$, remains at a given constant value which corresponds to maximum excitation of the motors $M_1$, $M_2$, $M_3$, $M_4$, as long as the amplitude of the signal EI delivered to the function generators 13 and 14 lies below the value $EI_o$ at which the function generator 13 attains its highest output signal $cge_o$. At higher input signal values than the said value EI, the ampltiude of the output signal $cme$ decreases linearly with increasing amplitude of the input signal EI.

The system shown in FIG. 1 also comprises means for generating a power error signal EP which is delivered by an operational amplifier 15. This signal EP is proportional to the difference between the predetermined or reference value PDr of the diesel engine power corresponding to the measured speed $nm$ of said engine and the electric power PG delivered by the generator.

The generator power signal PG is delivered by a multiplier 18 connected to a device 21 for measuring the generator voltage and to a comparator 22. The latter compares the currents flowing in the two parallel branches of the armature windings, as measured by the current measuring devices 23 and 24, and transmits a signal I′ corresponding to the higher of said two currents to the multiplier 18, which produces the signal PG corresponding to the generator power.

The two current measuring devices 23, 24 are pulse generators delivering voltage pulses of fixed amplitude at a constant repetition rate e.g. of 400 pulses per second, the width i.e. the duration of said pulses however being proportional to the current passing through the corresponding branch of armature windings. The voltage pulses delivered by the devices 23 and 24 are transmitted to the comparator 22 as well as to an operational amplifier 25 adapted to deliver two D.C. signals $cme'$, $cme''$ of equal amplitude but of opposite sign, which are proportional, up to a given limiting value, to the difference between the currents measured by the devices 23 and 24. The two outputs of device 25 are connected respectively to the rectifying devices 8 and 11.

The diesel power reference signal PDr is delivered by a function generator 17 which receives a signal $nm$ proportional to the engine speed from a speedometer-generator 16. As indicated by the characteristic power reference-speed curve shown in block 17 in FIG. 1, the diesel power reference signal PDr rises with engine speed $nm$, from the idling speed to the maximum speed, this characteristic being determined by the diesel engine designers manufacturers for optimum operation of the engine.

As is indicated diagrammatically in FIG. 1, the operational amplifier 15, which has a third input receiving an injection error signal Ei which will be explained hereinafter, effects the subtraction of the signals PDr and PG and delivers the power error signal EP to a signal-limiting function generator 19. As indicated in the corresponding characteristic shown in FIG. 1, the function generator 19 delivers a current reference signal Ir which is proportional to the input power error signal EP up to a given limiting value determined in each case by the set engine speed $ns$, corresponding to the set position of the diesel speed control member CM, and remains constant at higher values of the input signal EP. The action of this control member CM on the function generator 19 is indicated diagrammatically by a dotted line in FIG. 1 and will be described hereinafter in connection with FIG. 4c.

The current reference signal Ir is delivered to the above mentioned operational amplifier 20 which also has a second input connected to the output side of the comparator 22 for reasons to be explained hereinafter.

As may further be seen in FIG. 1, the above mentioned injection error signal Ei is delivered to the operational amplifier 15 by an integrating device 30 connected on the input side to a further operational amplifier 29. The later receives the diesel injection control signal $ic$ delivered by the speed control device C as well as an injection reference signal $ir$ and delivers to the integrating device 30 a signal proportional to the difference $ir-ic$. A further function generator 28 which is operatively connected to the control member CM of the diesel engine, delivers the said injection reference signal $ir$ proportional to the predetermined or reference injection rate prescribed by the manufacturers for the speed $ns$ corresponding to the set position of the control member CM.

FIGS. 3 to 5 illustrate, by way of example, some electrical diagrams which may be used in embodiments of the devices shown in the block diagram in FIG. 1, namely the rectifying devices, function generators and the comparator.

FIGS. 3a and 3b show diagrammatically the electrical circuits of the rectifying devices 2 and 8, 12 respectively. FIG. 3b applies to both devices 8 and 12 as they are identical. As may be seen in FIGS. 3a and 3b, a grid-controlled rectifier R is provided for each phase U, V, W of the three-phase A.C. supply. The controlled rectifiers R used in the device 2, as well as in the devices 8 and 12, may either be of the well known thyratron type or, preferably, of the silicon controlled type, also know as thyristor. Each controlled rectifier R is provided with a trigger circuit T adapted to deliver voltage pulses to the gate thereof to allow the respective rectifier R to conduct current when the anode voltage thereof is positive with respect to the cathode voltage. The value of the current thus transmitted is controlled by adjustment of the instant, in each A.C. cycle, when said voltage pulses are delivered by the trigger circuit to the gate. This adjustment is effected in the conventional manner by each trigger circuit T as a function of the amplitude of a control signal it receives from an operational amplifier (33 and 34 resp.). Current meusring devices 31, 32 are connected in series with the loads 1 and 5, 6 or 9, 10 respectively, and deliver to operational amplifiers 33 and 34 signals proportional to the rectified currents $I_G$ and $Im$ respectively. The amplifiers 33 and 34 also receive the above mentioned control signals $cge$ and $cme$ from the function generators 13 and 14 respectively and deliver trigger control signals proportional to the difference of their two inputs, so that the rectifying devices 2 and 8, 12 deliver excitation curents $I_G$ and $Im$ proportional to the respective control signals $cge$ and $cme$ delivered by the function generators 13 and 14. In addition, for the motor excitation, the amplifiers 34 of the rectifying devices 8 and 12, also receive corrective signals $cme'$ and $cme''$ respectively, the purpose of which will be described hereinafter.

FIGS. 4a to 4c show electrical circuits such as may be used in the function generators 13, 14, 19, 17 and 28 respectively which are shown diagrammatically in FIG. 1. These function generators are all of the diode ($d$) and resistor ($r$) type widely used in electronic analog computer circuits as well as in automatic control circuits. Such function generators generally comprise at least one constant-value resistor ($r$), a bias voltage source ($e$), and at least one diode ($d$).

The operation of the function generator 13 may be understood with reference to FIG. 4a. The output signal cge will be proportional to the input signal EI, until cge attains the bias voltage applied at the cathode of the diode, i.e. until the voltage at point P is equal to the voltage at point Q. On further increase of the input signal EI the output cge will remain constant as the diode will become conducting and the dynamic impedance as seen from point P will become negligible.

As may be seen in FIG. 4b, the function generator 14 comprises a resistor r14 arranged in series with a diode d14, which is negatively biased by a voltage source e14, and a summing amplifier a14 e.g. of the transistor type which also receives a constant negative voltage signal Vo. The output signal cme will be constant and proportional to the value of Vo, as long as the input signal EI is smaller than the bias voltage of e14. At higher values of EI, the diode d14 becomes conducting and the output signal cme will decrease linearly with increase in EI.

As may be seen in FIG. 4c, the signal-limiting function generator 19 is essentially analogous to the function generator 13, the only difference being that the bias voltage e19 is variable as a function of the position of the speed control member CM of the diesel engine, which member is represented in dotted lines in FIG. 4c.

The function generators 17 and 28 (see FIGS. 4d and 4e) are basically of output the same type as the function generator 13 (see FIG. 4a), the curved characteristic, however, consisting of a succession of linear segments between breakpoints corresponding to input voltage levels at which the various diodes d17a to d17n and d28a to d28n become conducting.

Referring to FIG. 5 which shows the comparator 22, it may be seen that the latter comprises a diode network comprising two diodes d22a and d22b which receive the voltage pulse sigals I1 and I2 respectively. As has been mentioned hereinbefore and is represented diagrammatically in FIG. 5, these signals are both of constant amplitude and have a constant repetition rate, the only difference being in the width, i.e. the duration thereof, which is proportional to the current measured by the respective devices 23 and 24. Of the two signals entering the diode network d22a, d22b, only the signal with the larger duration will be transmitted, which is then filtered by the filtering circuit consisting of resistors and capacitors, thus giving a D.C. output signal I′ proportional to the highest of the two currents measured by the devices 23 and 24.

The multiplier 18 indicated diagrammatically in FIG. 1 may be of the time-division type known in the analog computer art, in which the two inputs are each obtained in the form of voltage pulse trains of fixed repetition rate, the width of the pulses in the first train being proportional to a first input and the amplitude of the pulses in the second train being porportional to the second input. The first and second pulse trains are combined in an appropriate switching circuit adapted to deliver a third pulse train consisting of pulses at the same repetition rate, having a pulse width equal to that of the pulses of the first pulse train and an amplitude equal to that of the pulse of the second pulse train. By filtering this third pulse train, one obtains a D.-C. output signal proportional to the products of the two inputs. In the multiplier 18, the inputs $U_G$ and I′ are delivered respectively by the voltage measuring device 21 and the comparator 22, while the output signal is the D.C. signal PG. Operational amplifiers such as 15, 20, 25 and 29 as well as the integrator 30 are widely used in automatic control art and may be of the well known D.C. differential transistor type.

It will be clear, however, to those skilled in the automatic control art that the embodiments of the devices hereinbefore mentioned and described with reference to FIGS. 3 to 5, may be modified at will within the scope of this invention. Thus, for example, the function generator 28, operational amplifier 29 and integrator 30 may consist of combined mechanical, hydraulic and electrical means for producing the injection error signal $Ei$, the integrator 30 being e.g. a hydraulic servo motor connected to the slide, a rheostat to provide signal $Ei$, said motor being controlled by a system of linkages which transforms a mechanical signal $ns$ to $ir$, subtracts $ic$ from $ir$ and controls the delivery of fluid to the said hydraulic motor.

Figure 2:
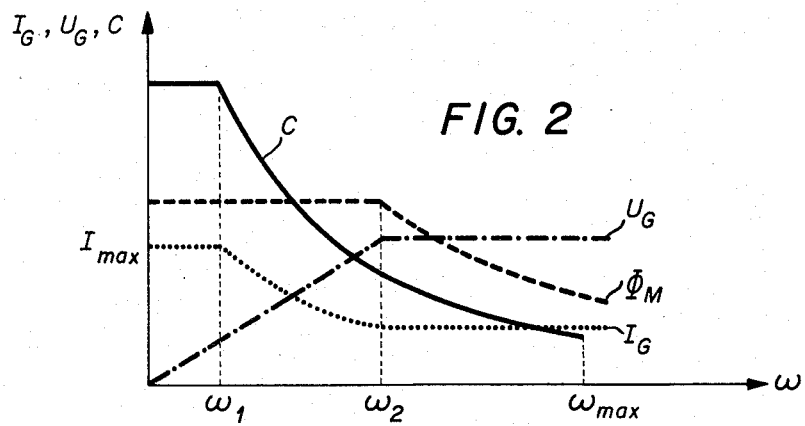
FIG. 2 illustrates the characteristic control curves.

The system hereinbefore described operates as follows:

At starting, current limiting is provided by limitation of the power error signal EP at the output of the operational amplifier 15. The limitation of the error signal is produced by means of the function generator 19 in such manner that the maximum amplitude of the output signal $Ir$ varies with the position of the control member CM. The signal $Ir$ at the output of the generator 19 therefore represents a reference of the current which the generator G should deliver to the motors. The signal I′ delivered by the comparator 22, which is applied to the second input of the operational amplifier 20 and corresponds to the greater of the two currents flowing through the two branches of motor armature windings, is subtracted from the signal $Ir$ delivered by the generator 19, thus providing current negative feedback. As the foregoing shows, current limitation at starting is thus provided by control of the current in the main electric circuit. The value of the reference current depends upon the position of the control member CM, thus allowing the starting torque to be controlled in dependence of the position of the speed control member CM as set by the driver. This regulation based on current control is operative until the vehicle speed $\omega_1$ (see FIG. 2) is reached. At higher speeds, the automatic control proper takes over, which consists in power control of the main electric circuit thus providing the desired hyperbolic torque characteristic (see curve C, FIG. 2).

In a first zone of normal operation, i.e. from speed $\omega_1$ to speed $\omega_2$ (see FIG. 2), control is likewise by action on the voltage of the generator G via its excitation. At any given speed of the diesel engine, the electric power as expressed by the output signal PG of the multiplier 18 is constantly compared with the diesel power expressed by the reference signal PDr delivered by the generator 17. The difference $PDr - PG$ representing the power error is amplified to provide the power error signal EP at the output of the amplifier 15 and is transmitted by the generator 19 and the amplifier 20 to the generator 13. The latter delivers the control signal cge to the rectifier 2 to modify the field current and thus the generator voltage ($U_G$, see FIG. 2), so that the generator G delivers an electric power PG equal to the reference power PDr of the diesel. In this zone of operation, the flux ($\Phi m$) of the motors is maximum and constant (see FIG. 2).

In a second zone of normal operation extending between the vehicle speeds $\omega_2$ and $\omega_{max}$. (see FIG. 2), control is effected by action on the motor. Once generator excitation has reached its maximum, i.e. when the power error exceeds the value at which the generator 13 delivers a signal corresponding to such maximum excitation, the generator 14 delivers a control signal cme which decreases with increasing power error, thus reducing the motor field currents by acting on the rectifiers 8 and 12.

Load-balancing in the two motor groups is effected as follows:

Assuming, for instance, that the current flowing through the motors $M_1$ and $M_2$ is greater than the current flowing through the motors $M_3$ and $M_4$, the amplifier 25 will deliver a positive signal cme′ at the output connected to the rectifier 8, and a negative signal cme″ = —cme′ at the output connected to the rectifier 12. Consequently, the signal delivered by the comparator 25 is added on one hand to the signal delivered by the generator 14, thus increasing excitation of the motors $M_1$ and $M_2$ and therefore decreasing the current flowing through the said motors while on the other hand the signal delivered by the comparator 25 is subtracted from the signal $cme$ delivered by the generator 14 thus decreasing the excitation of the motors $M_3$ and $M_4$ and therefore increasing the current flowing through said motors.

The fact that the higher of the two currents flowing through the two motor groups is used for the current negative feedback $I'$, allows, in the case of wheel slip in a motor in one of the groups, the generator voltage to be kept constant so that the current flowing through the motors of the other group also remains constant. This allows the tractive effort to be applied to the non-slipping motor group, so that starting can take place while wheel slip ceases automatically. Obviously, the same effect is obtained when wheel slip occurs at any speed. Consequently, maximum use of adhesion is possible under all operating conditions.

Automatic protection of the diesel engine against possible overloads due to mechanical failures or to the load represented by auxiliary circuits other than the shown power circuits is provided as follows:

When actual injection is greater than the reference injection $ir$ corresponding to the set speed $ns$ of the diesel engine, the integrator 30 delivers a signal $Ei$ of opposite sign to the signal $PDr$ delivered by the generator 17, for instance, a negative signal if the signal delivered by the generator 17 is a positive signal, so as to reduce the reference power of the diesel engine. The error signal $Ei$ disappears under normal operating conditions, when actual injection drops below the reference injection or is equal thereto, i.e. when the cause of the overload has disappeared.

As will be apparent, the system hereinbefore described provides automatic control of the electric machinery of a diesel-electric traction system, i.e. the control of an electric transmission in a simple way and using mainly electronic circuits. The system according to the invention also makes it possible to use separately excited motors with all their advantages while eliminating their disadvantages particularly by means of the above described load-balancing and current-limiting means.

We claim:

1. A diesel-electric power system for vehicle traction, comprising a separately excited, diesel-driven D.C. generator adapted to supply current to the armature windings of a plurality of separately excited D.C. traction motors having their armature windings disposed in at least two branches connected in parallel to said generator, an A.C. source connected respectively by means of controlled rectifiers to the field windings of said generator and of the motors in each of said branches, power error signal generating means adapted to continuously deliver a signal proportional to a difference between the predetermined value of the diesel engine power corresponding to the measured speed of said engine and the electric power delivered by the generator, control signal generating means for producing signals controlling the current delivered by each of said rectifiers, said means comprising a first function generator delivering a first control signal for the rectifier supplying the generator field winding, and said first control signal being substantially proportional to said error signal up to predetermined value thereof and remaining constant at higher values of said error signal, said means further comprising a second function generator delivering a second control signal for the rectifiers supplying the field windings of the motors of said branches, said second control signal being at a constant value thereof until said first control signal attains said predetermined value and thereafter decreasing linearly with increase in said error signal, and said system further comprising means for maintaining the currents passing through said parallel branches at values substantially equal to one another.

2. A diesel-electric power system as set forth in claim 1, wherein said power error signal is transmitted to said first and second function generators by means of a third function generator and an operational amplifier, the input of said amplifier being limited by said third function generator as a function of the position of the speed control member of said diesel engine, and said amplifier receiving a second signal proportional to the value of the highest armature current passing through said branches, whereby said third function generator and said summing amplifier achieved limitation of the armature current in said motors.

3. A diesel-electric power system as set forth in claim 1, wherein said means for maintaining the currents passing through said parallel branches at equal values comprise an operational amplifier adapted to deliver two further control signals, which are proportional to the difference between the currents in said parallel branches and are of opposite sign, to the rectifiers associated with the field windings of the motors of each branch, such that the excitation is increased in the branch with the highest armature current and decreased in the branches with the lowest armature currents.

References Cited by the Examiner

UNITED STATES PATENTS 3,183,422  5/1965  Stamm _____ 318—98

ORIS L. RADER, *Primary Examiner.*

G. SIMMONS, *Assistant Examiner.*